United States Patent [19]

Gerdemann et al.

[11] Patent Number: 5,968,224
[45] Date of Patent: *Oct. 19, 1999

[54] RECOVERY OF TITANIUM VALUES FROM TITANIUM GRINDING SWARF BY ELECTRIC FURNACE SMELTING

[75] Inventors: Stephen J. Gerdemann; Jack C. White, both of Albany, Oreg.

[73] Assignee: The United States of America as represented by the United States Department of Energy, Washington, D.C.

[*] Notice: This patent is subject to a terminal disclaimer.

[21] Appl. No.: 09/126,867

[22] Filed: Jul. 31, 1998

Related U.S. Application Data

[63] Continuation-in-part of application No. 08/674,003, Jul. 1, 1996, Pat. No. 5,788,736.

[51] Int. Cl.⁶ .................................................. C22B 34/12
[52] U.S. Cl. .......................... 75/10.1; 75/10.35; 75/10.46; 75/10.61; 75/612; 420/590
[58] Field of Search ............................... 75/10.61, 10.35, 75/10.46, 612, 10.1; 420/590

[56] References Cited

U.S. PATENT DOCUMENTS 5,788,736   8/1998   Gerdemann et al. .................. 75/10.61

*Primary Examiner*—Melvyn Andrews
*Assistant Examiner*—Trina M. McGruthry-Banks
*Attorney, Agent, or Firm*—Mark F. LaMarre; Mark P. Dvorscak; William R. Moser

[57] ABSTRACT

A method for the recovery of valuable materials from titanium grinding swarf is provided comprising the steps of sieving the accumulated titanium grinding swarf to remove unwanted coarse trash and grinding wheel fragments, pelletizing, and smelting in an electric arc furnace to produce ferrotitanium and/or high titanium slag.

9 Claims, 3 Drawing Sheets

RECOVERY OF TITANIUM VALUES FROM TITANIUM GRINDING SWARF BY ELECTRIC FURNACE SMELTING

This application is a continuation-in-part of U.S. Ser. No. 08/674,003 filed on Jul. 1, 1996 now U.S. Pat. No. 5,788,736.

BACKGROUND OF THE INVENTION

1. Field of the Invention

This invention relates to the process of recovering titanium values from waste generated in the process of machining titanium metal. In particular this invention relates to a process for recycling titanium grinding waste into an environmentally safe form for subsequent use in industrial processes requiring high titanium feed stock.

2. Description of the Related Art

The process of grinding titanium metal creates a residue of partially oxidized titanium metal fibers or slivers, commonly known in the industry as "swarf". In addition to swarf, the residue of the titanium grinding process contains, coarse trash, and grinding wheel fragments. As a waste by-product, grinding swarf is stockpiled for later disposal. Because titanium is a highly reactive material, it has been known for these swarf piles to spontaneously ignite. The resultant titanium oxide is extremely brittle and of little titanium value. Currently, there is no processing method to render the grinding swarf chemically stable to the environment. Accumulation of titanium grinding swarf is estimated to reach one million pounds per year. Recovery of titanium values from accumulating titanium grinding swarf would conserve a valuable resource and reduce problems associated with the accumulation of hazardous process waste material.

The titanium value may be recovered from grinding swarf by rechlorinating it, introducing it with titanium tetrachloride and reducing the mixture to titanium chloride. However, titanium chloride, has a lower market value compared to scraps of titanium metal mixed with the grinding swarf.

Processes and methods for recovery of iron units from flue dust are similar to the method described herein and are generally well known in the art. One such method is described in U.S. Pat. No. 4,407,672, issued Oct. 4, 1983, to Ruger A. Deuschle and Charles P. Mueller, entitled "Method for the Recovery of Iron Units from Flue Dust Generated in a Steel Making Process." Recovery of iron units from flue dust does relate to the problems of handling fine particle material but does not address the problems associated with highly reactive titanium and the need to keep materials out of the recovery process which could contaminate the final ferrotitanium and/or titanium slag produced. Also, Megy, U.S. Pat. No. 5,171,359 discloses a composition that reuses high purity titanium slivers, commonly known as swarf, produced by a wet grinding process. The titanium swarf, for use with the invention of Megy, is low in impurities such as oxides and nitrides. Megy does not disclose a process for treating a low grade milling waste that may contain grinding residue, titanium oxide, or coarse impurities.

The present invention overcomes the deficiencies in the prior art methods for recovering titanium values from what would otherwise be considered a waste by-product of the titanium and steel industries. It provides a method of handling and smelting titanium grinding swarf without contaminating on going ferrotitanium and titanium slag production processes. In addition to recovering titanium values from the grinding swarf, the problem of disposing the metallic waste is solved and the recovered titanium will increase concentrations of titanium in high titanium slag and ferrotitanium for the steel industry.

SUMMARY OF THE INVENTION

The present invention is a method for the recovery of valuable materials from accumulating industrial waste in the metals' industry. High titanium grinding swarf, containing approximately 85-percent titanium metal, is sieved to remove coarse trash and grinding wheel fragments. The resulting fine grained material is pelletized with non-sulfur containing organic binders, such as tar or sugar to create a stronger and more stable form. Preferably, the agglomeration of the sieved swarf is accomplished by using a binder having a low level of alkali metals, a low level of alkali earth metals or a combination thereof. The pellets are then feed and mixed with alloy forming materials into an electric arc furnace, and smelted in an oxygen-free atmosphere.

In the preferred practice of the method, pelletized grinding swarf is smelted in an electric arc furnace to produce ferrotitanium for the steel industry and/or titanium slag for chlorination. Preferably, the pellets are dried to constant dry weight prior to smelting. An inert gas blanket may be used to create an oxygen-free atmosphere excluding oxygen while smelting the pellets in an electric arc furnace. The inert gas may be helium, argon, or nitrogen.

The low level alkali metal binders should contain less than about 2 percent by weight of lithium, potassium, sodium, or rubidium. The low alkali-earth metal binders should contain less than about 2 percent by weight of beryllium, magnesium, calcium, or strontium. Preferably, the low level alkali metal binders contain less than about 0.1 percent by weight of lithium, sodium, or potassium. More preferably the sieved titanium grinding swarf is pelletized with a sodium-free binder having less than 0.1% by weight of sodium. The sodium-free binder may be selected from the group consisting of water, sugar, molasses, hydrolyzed starch, and southern bentonite.

The objectives of this invention address both environmental and industry goals by providing a method to reduce the problems associated with the accumulation of grinding swarf and to recover and conserve a valuable titanium resource. Specifically, one objective of the invention is to end the considerable problem created by the accumulation of this highly reactive material by rendering it into a strong and stable form for handling. A second objective is to conserve titanium resources by reusing materials which would ordinarily be oxidized and discarded.

DESCRIPTION OF THE PREFERRED EMBODIMENTS

Figure 1:
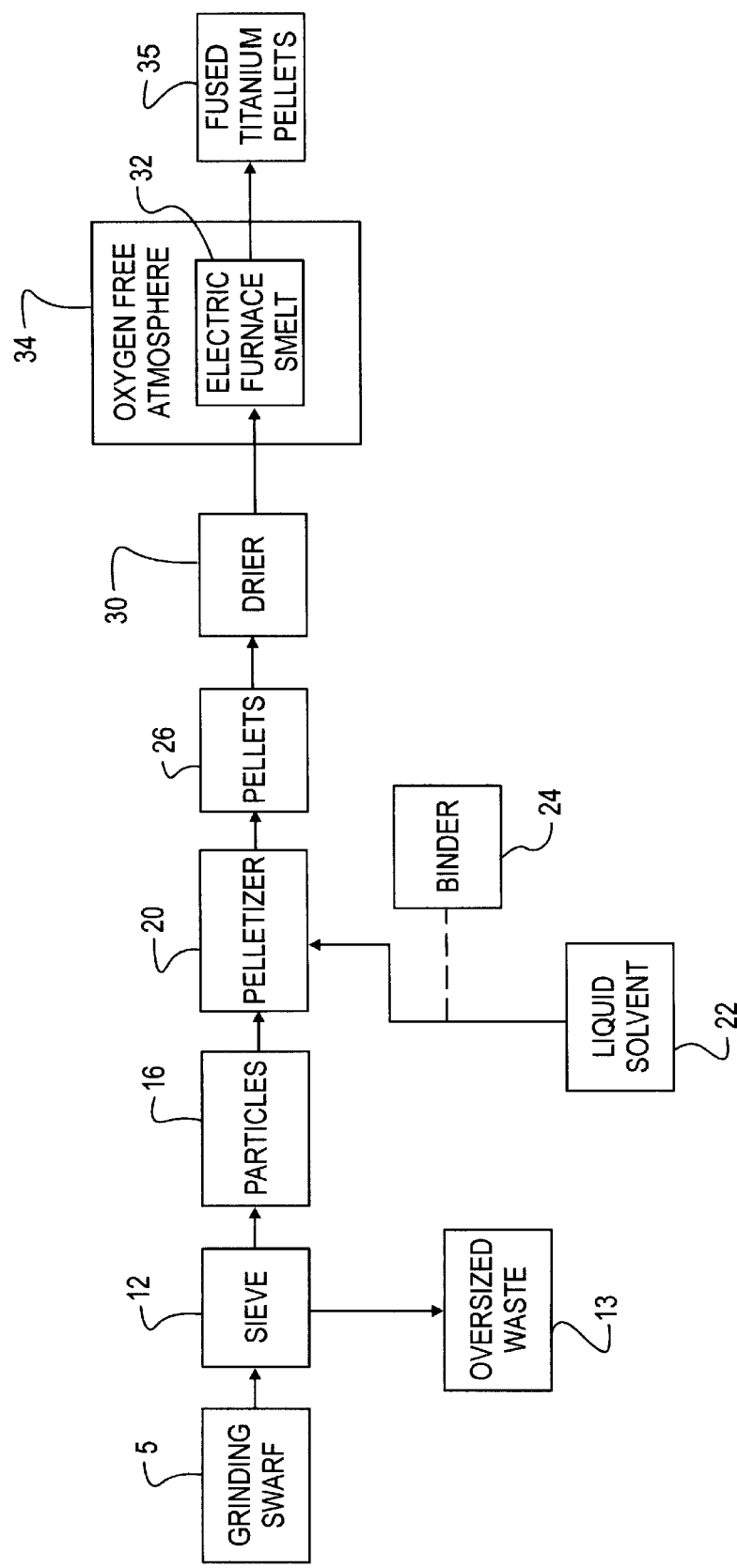
FIG. 1 is a schematic flow diagram, in block diagram form, of a collection and pelletizing system and method in accordance with the present invention.

The method described below may be carried out entirely with equipment standard in the industry. The process begins with titanium grinding swarf 5, a by-product from the titanium industry created during the machining of titanium ingots. Titanium grinding swarf 5 consist of fine grained metal particles containing about 85 percent titanium, coarse trash, and-grinding wheel fragments. As illustrated in FIG. 1, the titanium grinding swarf 5 is collected after machining processes and stockpiled. Unwanted materials mixed with fine grained, partially oxidized titanium metal particles, must be separated. To remove these larger particles, the stockpiled grinding swarf 5 is passed though a series of sieves 12. Oversized particles, those not passing through the sieves 12, are removed and stockpiled for later disposal 13.

The remaining fine grained, sieved grinding swarf particles 16 are formed into pellets using any pelletizing process 20 well known in the art and commercially available. As shown in FIG. 1, and as well known in the art, pelletizing or agglomerating processes require the addition of liquid solvent 22 in conjunction with binder 24 to help form the sieved grinding swarf particles 16 into pellets 26. The solvent may be water or any suitable liquid solvent. The purpose of forming the sieved grinding swarf particles 16 into pellets 26 is to improve strength and stability of the sieved grinding swarf particles 16 for transport and handling. Although these characteristics may be affected by several factors, they may be controlled with slight variations of residence time in the pelletizing process, adjustment of the flow of the liquid solvent 22 into the pelletizing process 20, or variation in the type of binder 24. All these process variables for the control of the final pellet strength and stability are well known in the art and may be varied without departing from the scope and concept of the present invention.

Other binders 24 may be introduced to aid the pelletizing process 20. It is important, however, that no binders 24 be used in the process which could be detrimental to subsequent processes to which the recovered titanium may be added. Suitable binders 24 include sugar, molasses, heavy oil, hydrolyzed starch, and southern bentonite. Others binders 24 may be substituted, all of which provide non-contaminating and non-dusting furnace feed. Western bentonite or sodium-silicate should not be used as binders 24 in preparation of titanium grinding swarf pellets 26 for addition into high titanium slag for use in chlorination, as these materials are high level of sodium. Sodium reacts with chlorine in the chlorinators to form sodium chloride. Sodium chloride forms a high viscosity, adhesive, liquid phase in fluidized bed chlorinators. Therefore, it is preferred that only non-sodium containing materials be used as binders for chlorination feed materials. These non-sodium containing materials should contain less than about 2 percent by weight of sodium and preferably less than 0.1% by weight of sodium.

Once the titanium grinding swarf is removed from the pelletizing apparatus, it is dried to a constant weight in drier 30. The purpose of such drying is to reduce the possibility of the titanium within the pellets reacting with oxygen within the liquid solvent 22 or the binder 24.

To further guard against titanium reacting with available oxygen, the pellets 26 formed from sieved grinding swarf particles 16 may be fed into the electric arc furnace 32 having an oxygen-free atmosphere 34 to produce fused titanium pellets 35. Neither oxygen furnaces nor open hearth furnaces are suitable for smelting the titanium grinding swarf pellets. Rather, an electric smelting furnace is particularly suitable for use as the electric arc furnace 32 of this process. To create an oxygen-free atmosphere 34, argon, krypton, xenon, nitrogen, or other inert gas, may be used to provide the oxygen-free atmosphere 34 in the electric arc furnace 32.

Figure 2:
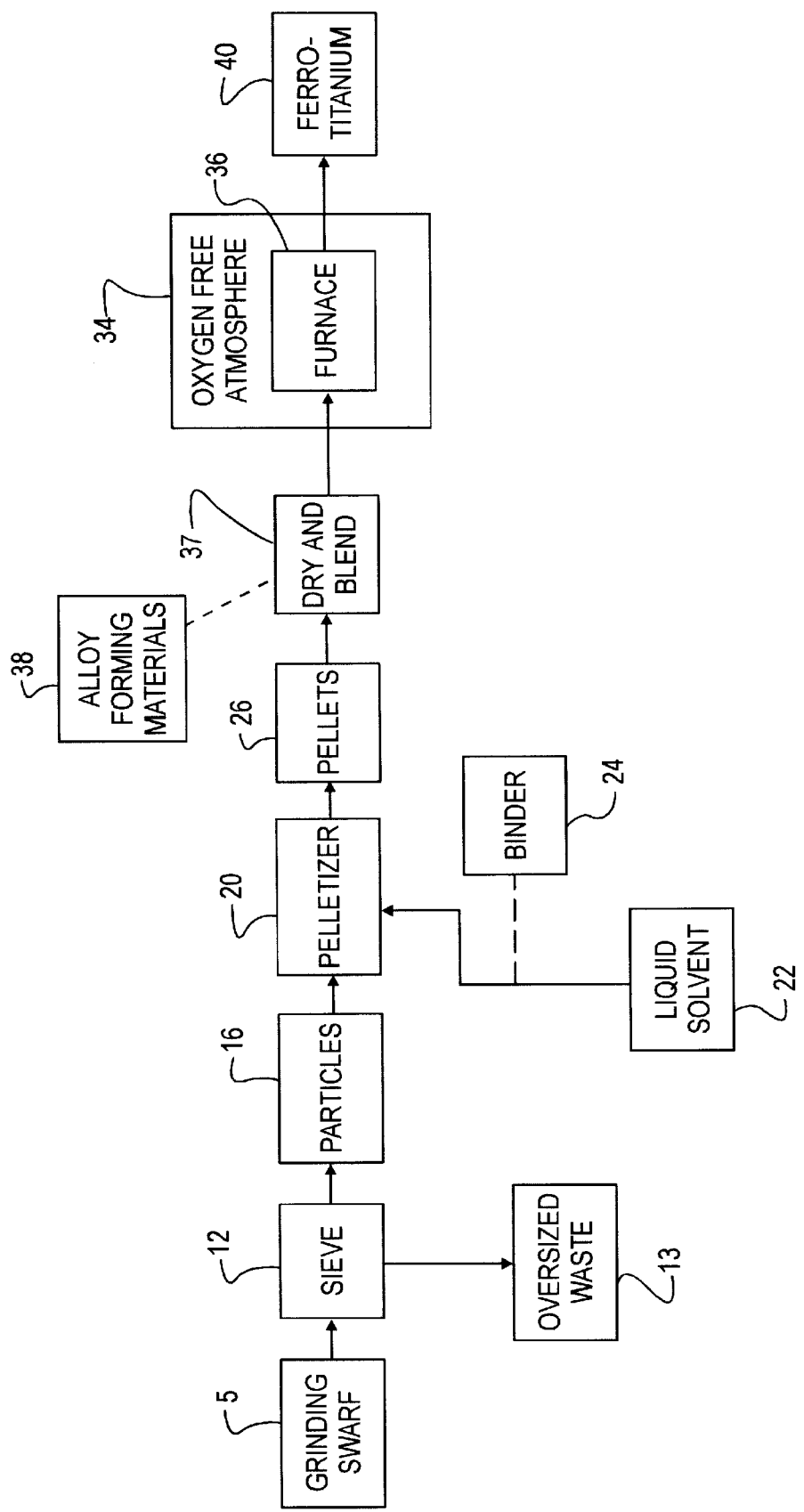
FIG. 2 is a schematic flow diagram, in block diagram form, illustrating the second embodiment of the present invention.

In a second embodiment of this process, as shown in FIG. 2, the pelletized titanium grinding swarf is dried and blended 37 with alloy forming materials such as scrap iron, sponge iron, or other suitable source of iron 38 and smelted in a suitable furnace 36 under oxygen-free atmosphere 32. This second embodied process will maximize the amount of ferrotitanium 40 produced from the titanium contained in the grinding swarf and thereby maximizing the value of contained titanium.

Figure 3:
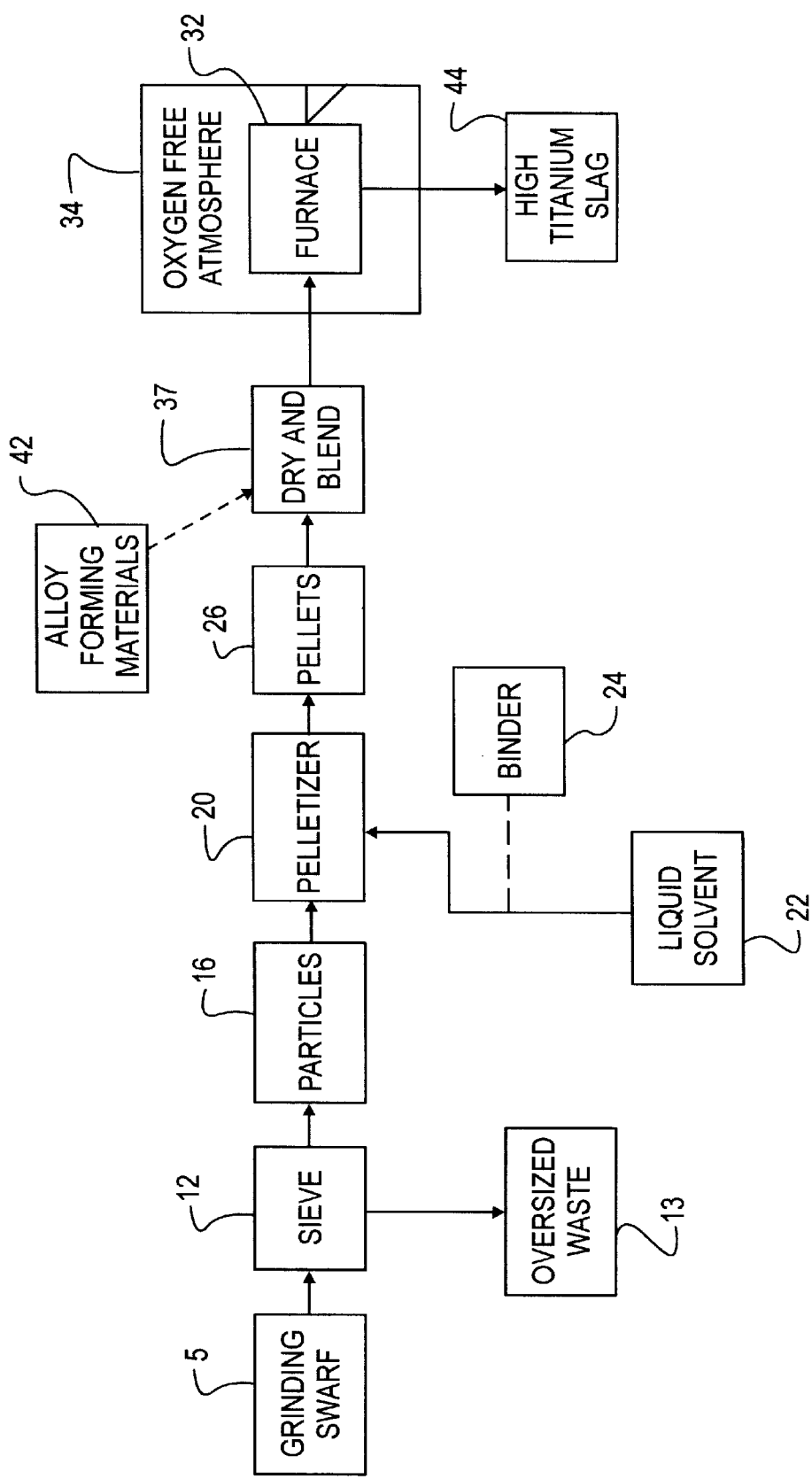
FIG. 3 is a schematic flow diagram, in block diagram form, illustrating the third embodiment of the present invention.

In a third embodiment, as shown in FIG. 3, the sieved and pelletized titanium grinding swarf may be dried and blended 37 with alloy forming materials 42, such as, but not limited to ilmenite ($FeTiO_3$) to produce a feed material for an electric arc furnace 32 to produce high titanium slag 44. This reactive furnace feed material will be partially self-heating thereby minimizing electric power costs for electric furnace 32. Adding the pelletized titanium grinding swarf will increase the titanium concentrations in the titanium slag produced.

From the description of the invention and its alternative embodiments, it can be seen that the proposed method for combating disposal problems associated with accumulating titanium grinding swarf while recovering a valuable resource contained within it is relatively simple and inexpensive process requiring no new equipment to employ. While the methods described constitutes some preferred embodiments of the invention, it will be recognized by those skilled in the art that changes may be made without departing from the scope of the invention as defined in the appended claims.

We claim:

1. A method of producing titanium slag from titanium grinding swarf, comprising the steps of:

collecting grinding swarf waste, comprising finely ground partially oxidized high titanium metal swarf, coarse trash and grinding media, from the processing of a titanium ingot;

sieving the grinding swarf to remove coarse trash and grinding media, leaving fine grained, partially oxidized high titanium metal swarf;

agglomerating the sieved swarf with a binder into pellets in a pelletizing apparatus wherein the binder is selected from the group consisting of a binder having a low level of alkali metal and a binder having a low level of alkali earth metal.

feeding the pellets and mixing with alloy forming materials into an electric arc furnace; and smelting the pellets and alloy forming materials in an oxygen-free atmosphere.

2. The method of claim 1 wherein the pellets are dried to constant dry weight.

3. The method of claim 1 wherein an inert gas blanket is used to create an oxygen-free atmosphere excluding oxygen while smelting the pellets in an electric arc furnace.

4. The method of claim 3 wherein the inert gas is helium, argon, or nitrogen.

5. The method of claim 1 wherein the low level alkali metal binders contain less than about 2 percent by weight of lithium, potassium, sodium, or rubidium.

6. The method of claim 5 wherein the sieved titanium grinding swarf is pelletized with a binder which contains no sodium.

7. The method of claim 6 wherein the sodium-free binder is selected from the class consisting of water, sugar, molasses, hydrolyzed starch, and southern bentonite.

8. The method of claim 1 wherein the low level alkali-earth metal binders contain less than about 2 percent by weight of beryllium, magnesium, calcium, or strontium.

9. The method of claim 1 wherein the low level alkali metal binders contain less than about 0.1 percent by weight of lithium, sodium, or potassium.

* * * * *